United States Patent [19]

Kurz

[11] Patent Number: 4,677,941
[45] Date of Patent: Jul. 7, 1987

[54] ELECTRICAL COOLING FAN

[75] Inventor: Erich Kurz, Wiernsheim, Fed. Rep. of Germany

[73] Assignee: Dr. Ing. h.c.F. Porsche Aktiengesellschaft, Fed. Rep. of Germany

[21] Appl. No.: 763,265

[22] Filed: Aug. 7, 1985

[30] Foreign Application Priority Data

Aug. 7, 1984 [DE] Fed. Rep. of Germany ....... 3429052

[51] Int. Cl.⁴ .............................................. F01P 5/02
[52] U.S. Cl. ............................. 123/41.12; 123/41.49; 123/198 R
[58] Field of Search ............... 123/41.11, 41.12, 41.49, 123/41.65, 41.66, 198 R

[56] References Cited

U.S. PATENT DOCUMENTS

| 3,964,444 | 6/1976 | Hemmann et al. | 123/41.12 |
| 4,327,674 | 5/1982 | Takei | 123/41.49 |
| 4,409,933 | 10/1983 | Inoue | 123/41.12 |

FOREIGN PATENT DOCUMENTS

| 2121053 | 11/1971 | Fed. Rep. of Germany. | |
| 2237979 | 2/1974 | Fed. Rep. of Germany. | |
| 2317488 | 2/1977 | France. | |
| 139033 | 12/1978 | Japan | 123/41.12 |
| 96116 | 6/1983 | Japan. | |
| 569274 | 5/1945 | United Kingdom. | |
| 1284256 | 8/1972 | United Kingdom. | |
| 1520030 | 8/1978 | United Kingdom. | |
| 1554695 | 10/1979 | United Kingdom. | |

Primary Examiner—William A. Cuchlinski, Jr.
Attorney, Agent, or Firm—Barnes & Thornburg

[57] ABSTRACT

An electric cooling fan arrangement having a detachable resister connected therewith for operating the cooling fan at a decreased rotational speed during periods of decreased cooling air requirement. This is especially desirable for removing the accumulated or built-up heat after the internal combustion engine of a motor vehicle has been switched off. The noise emission of the vehicle is thereby substantially lowered, while at the same time by using the rear window heater as drop resistor, a simple and economical realization of the electric cooling fan is developed.

15 Claims, 3 Drawing Figures

4,677,941

ELECTRICAL COOLING FAN

BACKGROUND AND SUMMARY OF THE INVENTION

The invention relates in general to an electric cooling fan, for engines and in particular to an electric cooling fan for internal combustion engines of motor vehicles.

Electric cooling fans are used more and more in motor vehicles for technical and economical reasons, rather than using cooling ventilators which are directly and mechanically driven by the internal combustion engine, because the former are easier and more economically switched on and off. The present cooling fans, however, which remove built up heat within the internal combustion engine space of a motor vehicle, have a relatively high noise level which is recognized as especially disturbing in the slow-down phase of the cooling fan after the ignition has been turned off.

The German Published Unexamined Patent Application, DE-OS No. 21 21 053, describes an electro-cooling ventilator for combustion engines of motor vehicles, whereby an electromotor of the cooling ventilator runs continuously during the operation of the engine with a lower rotational speed, and a thermostatic switch bridges an additional resistor during increased cooling air requirements. This arrangement includes the resistor element as an additional resistance for lowering the rotational speed. However, this resistor element has a relatively large dimension and, therefore, requires additional space. Additionally, this arrangement is relatively expensive and exhibits additional problems concerning the cooling down.

It is, therefore, an object of this invention to provide an improved electric cooling fan for engines such as an internal combustion engine of motor vehicles.

It is further an object of the invention to provide an improved electric cooling fan having an electromotor and an additional resistor for purposes of reducing the noise emission during decreased cooling air requirement.

It is also an object to provide an electric cooling fan which requires less structural space, is more cost efficient, and does not require additional means for carrying-off excess heat.

The above and other objects are attained by an electric cooling fan arrangment having an electric motor. The motor is independently controllable by a thermostatic switch which is responsive to the temperature of the engine, generally taken from the engine coolant. The arrangement includes a resistive element which is detachably coupled to the motor for providing a torque reduction of the motor during periods of decreased air cooling requirements, which occur after the engine has been turned off. The rear window heater unit serves as the resistance element in the preferred embodiment.

The advantages of the invention are seen during periods of decreased cooling air requirement, and in particular during the removal of built-up or accumulated heat after the engine has been switched off. During these periods, the electromotor of the cooling-ventilator runs with a lower rotational speed, and thereby produces less disturbing noises. By utilizing the existing rear window heater as drop resistor, an otherwise necessary resistor element is eliminated, since the rear window heater exhibits a range of resistance level suitable for a supplemental resistance. The initial purpose of the rear window heater, which today is present in practically all motor vehicles especially in passenger motor vehicles, has thereby been widened. Furthermore, the stray power released via the rear window heating unit, may be utilized for keeping the rear window free of eventual condensation.

DETAILED DESCRIPTION OF THE DRAWINGS

Figure 1:
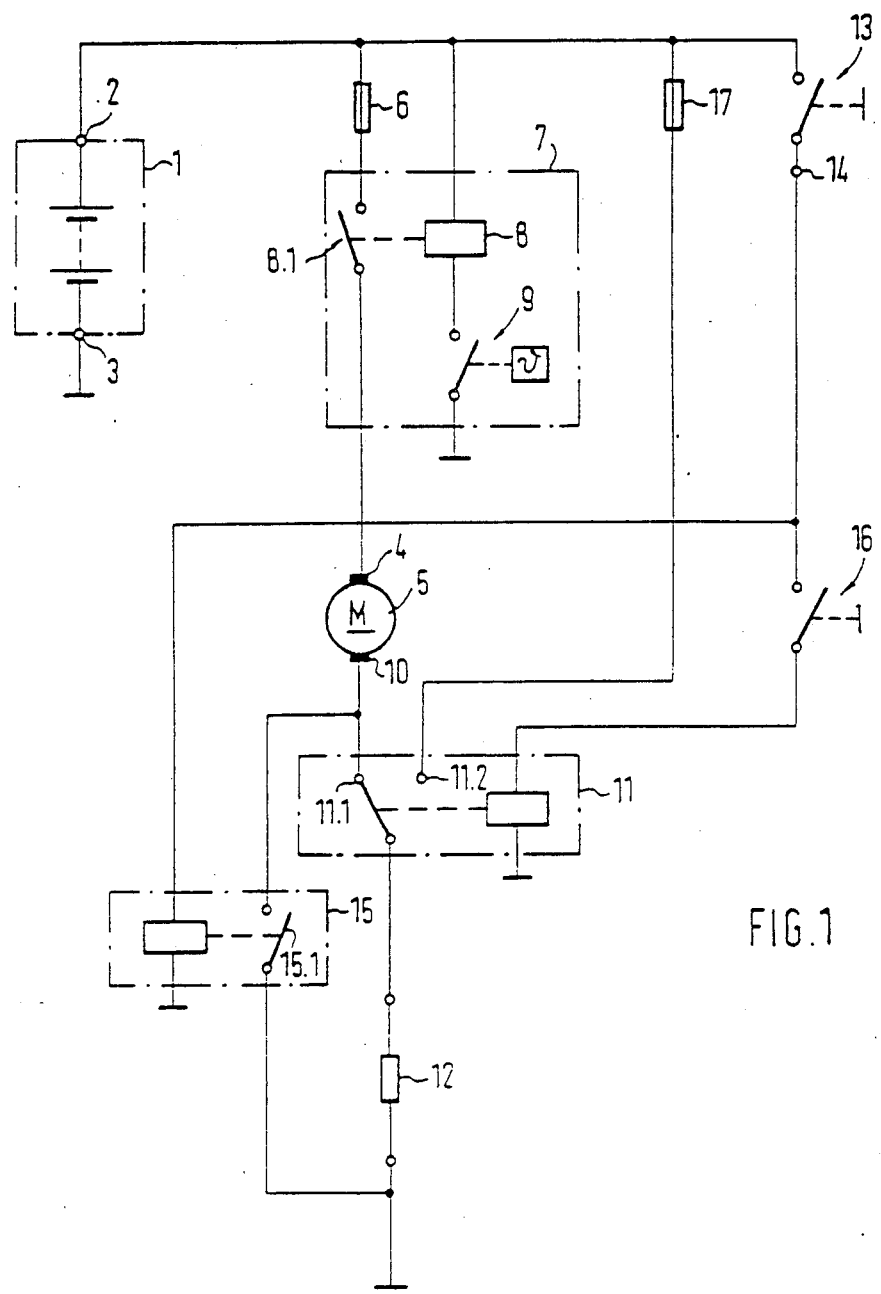
FIG. 1 is a schematic diagram according to a first embodiment of the invention.

In FIG. 1, an electrical supply circuit having a battery 1 includes a first pole 2 (positive pole) and a second pole 3 (negative pole), the latter of which is connected to the vehicle body (car body).

A first pole 4 of an electromotor 5 of a cooling ventilator is connected to the first pole 2 of the battery via a first fuse 6 and a thermostatic switch 7. The thermostatic switch 7 controls a flow medium such as the coolant of an internal combustion engine. If the temperature of the flow medium reaches above a certain level, a circuit is closed between the first fuse 6 and the electromotor 5 by means of a make contact switch 8.1. The make contact switch 8.1 is activated either directly by thermostatic action or by a relay spool 8, the control circuit of which is connected to the first pole 2 and via a thermostatically activated switch 9 to the second pole 3 of the battery 1.

A second pole 10 of the electromotor 5 is connected to the vehicle body by way of a back-to-back contact 11.1 of a rear window heating relay 11 and a rear window heating unit 12 when an ignition circuit 14 controlled by means of an ignition switch 13 is switched off. If the thermostatic switch 7 is also activated, the electromotor 5 runs with the rear window heating unit 12 as drop resistor, thereby with a lowered rotational speed.

By switching on the ignition switch 13, a short-out relay 15 is activated, the make contact 15.1 connects the second pole 10 of the electromotor 5 directly to the car body, so that the electromotor 5 operates with full rotational speed when the thermostatic switch 7 is activated. At this point, the rear window heating relay 11 can be activated by means of a rear window heating switch 16 which connects the rear window heating unit 12 to the first pole 2 of the battery 1 via a second back-to-back contact 11.2 of the rear window heating relay 11 and a second fuse 17.

Figure 2:
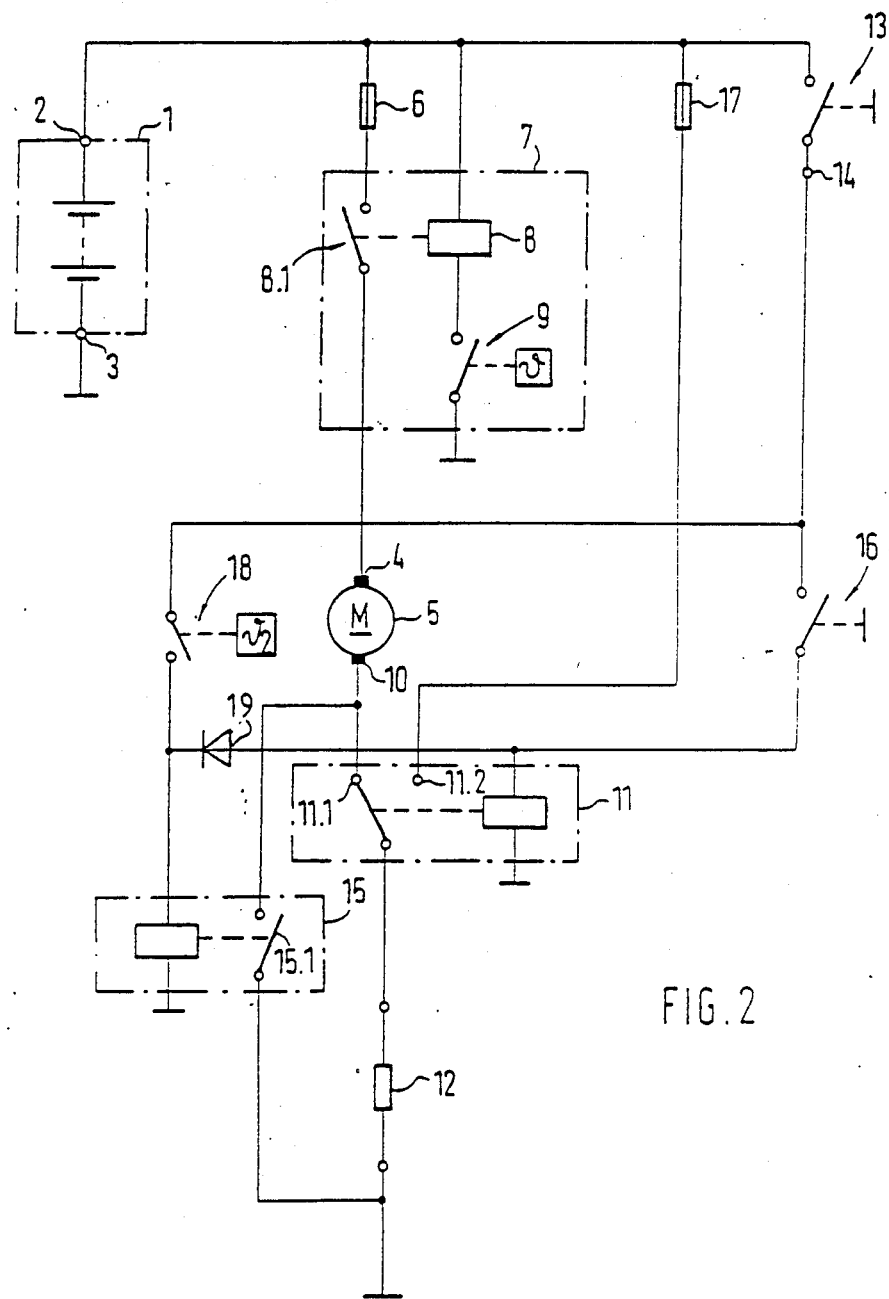
FIG. 2 is a schematic diagram according to a second embodiment of the invention.

In the embodiment of the invention shown in FIG. 2, the electromotor 5 operates with the rear window heating unit 12 as drop resistor, even when the ignition switch 13 is switched on. Thus the electromotor 5 may operate at a decreased rotational speed when only a reduced cooling air requirement exists and the rear window heating unit is switched off. To accomplish this, an additional thermostatically activated switch 18 is utilized in the connection line between the ignition switch 13 and the short-out relay 15. The switch 18 closes its circuit at a temperature level which is several degrees Celsius, preferably 3° to 5° Celsius (5° to 9° Fahrenheit), higher than the temperature responded to by the thermostatically activated switch 9. If switch 16 is switched on simultaneously with the thermostatic switch 7, the short-out relay 15 is then activated by forward biased diode 19 which connects the control circuit of the rear window heating relay 11 and the short-out relay 15. Consequently, the rear window heating unit 12 and the electromotor 5 are operated with full power.

Figure 3:
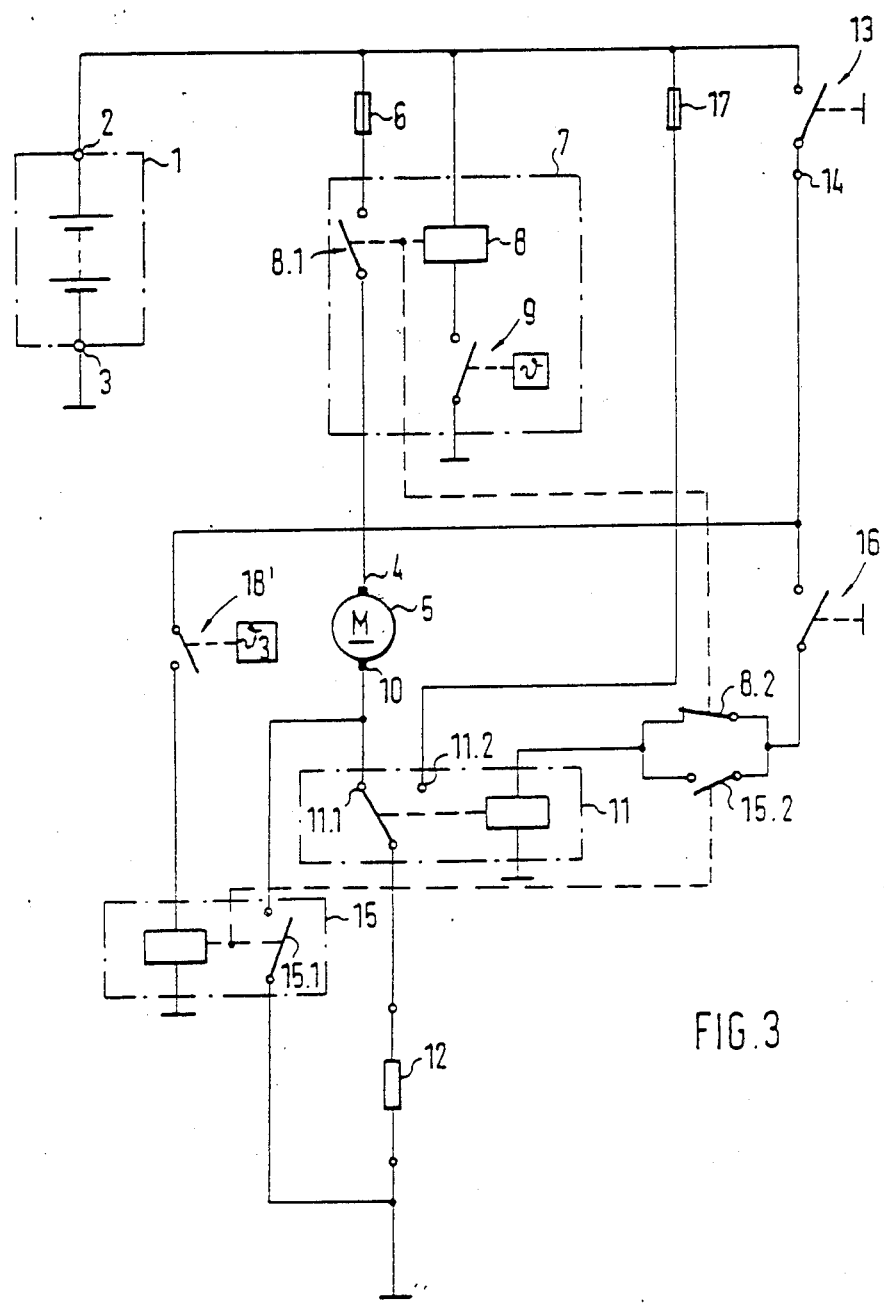
FIG. 3 is a schematic diagram according to a third embodiment of the invention.

In the embodiment of the invention shown in FIG. 3, the electromotor 5 is connected at rear window heater unit 12 independent of the operation of the rear window heating switch 16 during the period of decreased cooling air requirement wherein the temperature is sufficient to close thermostatic switch 9 but not sufficient to close thermostatic switch 18'. The rear window heating unit 12, therefore, only releases its full heating power when the rear window heating switch 16 is switched on and either during the period when the electromotor 5 is switched off by thermostatic switch 7 being off or when it is fully accelerated by short out switch 15 being closed by thermostatic switch 18' being on. This, however, is entirely sufficient since the rear window heater unit 12 eliminates a fogged or iced-in rear window normally much faster than the time required for the heating-up process of an internal combustion engine to reach its operational temperature; thereafter a decreased heating effort is sufficient to avoid a refogging or reicing of the rear window.

Thermostatically activated switch 18' is, therefore, provided similar to switch 18 in FIG. 2 whereby the switch 18' is between the ignition switch 13 and the short-out relay 15. A parallel connection of a brake contact 8.2 activated by relay 8 and a make contact switch 15.2 activated by short-out relay 15 is connected between the rear window heating switch 16 and the rear window heating relay 11.

When the temperature of the engine is below a first specified threshold level, V, thermostatic switch 9 will be open, thereby maintaining the electromotor 5 off. This will also maintain the brake contact 8.2 in its closed position, thereby allowing the rear window heater unit 12 to operate should both ignition switch 13 and heating switch 16 be switched on. When the temperature of the engine is above a second specified threshold, then both thermostatic switches 9 and 18' are activated, thereby triggering relay 8 and 15 respectively. This allows the electromotor 5 to be directly connected to the power supply by short out relay 15, by passing the resistive heater unit 12, and allowing the electromotor to run at full power when the ignition switch 13 is switched on. Although brake contact 8.2 is opened by the activation of thermostatic switch 9, the make contact 15.2 is closed by the activation of thermostatic switch 18' which allows the rear window heater unit 12 to be turned on by switching on the rear window switch 16. When the temperature of the engine is between these two specified temperatures, only thermostatic switch 9 will be closed, thereby opening the brake contact 8.2. Because make contact 15.2 is also open in this temperature range, the electromotor 5 will be line with the rear window independent of whether the rear window heating switch is switched on or not.

The relays 8 and 11 may be designed as electronic semiconductor switches. Additionally it is especially advantageous if the semiconductor switches are short-circuit safe and include an equilizing current switch-off device, such as done in DE-OS No. 31 38 645, thereby eliminating the need for the first 6 and second 17 fuses which are contained in their respective mode control circuits.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An electric cooling fan arrangement having an electric motor for engines such as for internal combustion engines of motor vehicles, wherein said electric motor is independently controllable by a thermostatic switch means which activates upon the engine temperature reaching a first specified threshold temperature, said arrangement comprising:
   an electric resistance means detachably connected in series to said electric motor for reducing the speed of said electric motor during decreased cooling air requirements of said engine,
   wherein said resistance means includes a rear window heating unit.

2. An arrangement according to claim 1, wherein said engine includes a flow medium having a temperature associated therewith, said thermostatic switch means includes a means for sensing said temperature of said flow medium.

3. An arrangment according to claim 1, further comprising a rear window heating relay means having a first contact means for detachably connecting in series with said electric motor and said heater unit when said engine is switched off.

4. An arrangement according to claim 3, further comprising a battery means connected in series with said electric motor and said thermostatic switch means;
   an ignition switch means connected in series with said battery means for turning on said engine on and off:
   a short out switch means connected to said ignition switch means and in parallel to said heater unit for connecting said electric motor without the heat unit connected in series with it when said ignition switch means is switched on.

5. An arrangement according to claim 4, further comprising a rear window heating switch means connected in series with said ignition switch and an actuating means of said rear window heating relay means for activating said actuating means when said heating switch means is switched on, wherein said rear window heating relay means further includes a second contact means connected in series with said battery means and said heating unit when said heating switch means and said ignition switch means are both switched on for turning on said heating unit without said electric motor.

6. An arrangement according to claim 5, further comprising a second thermostatically activated switch means connected in series between said ignition switch means and said short out switch means for providing a continuous connection therebetween when said engine temperature is above a second specified threshold.

7. An arrangement according to claim 6, further comprising a diode means connected in series with said heating switch means and said short out relay means for activating said short out switch means when said rear window heating switch means is switched on irrespective of said second thermostatically activated switch means.

8. An arrangement according to claim 6, further comprising a parallel switch means connected in series with said rear window heating switch means and said rear window heating relay means for providing a connection between said heating switch means and said heating relay means when said engine temperature outside the range defined by said first specified threshold and second specified threshold.

9. An arrangement according to claim 8, wherein said parallel switch means include a break contact means activated by said thermostatic switch and a make contact means activated by said short out relay means.

10. An arrangement according to claim 8, wherein said thermostatic switch means includes a first thermostatically activated switch means, wherein said second thermostatically activated switch means is activated at a slightly higher temperature range than said first thermostatically switch means.

11. An arrangement according to claim 10, wherein at least one said switch means and relay means is an electronic semiconductor switch.

12. An arrangement according to claim 11, wherein said semiconductor switch includes a means for equalizing current switch off.

13. An electric cooling fan having an electric motor for engines such as for internal combustion engines of motor vehicles, and a battery means, said arrangement comprising:
- a thermostatic switch means detachably connecting in series with said electric motor and said battery means for providing a connection when said engine has a temperature above a first specified threshold;
- an electric resistance means detachably connected in series with said electric motor for reducing the speed of said electric motor when said engine is switched off; and further comprising a means for heating a rear window and wherein said electric resistance means includes means for connecting said rear window heating means in series with said motor to reduce current through said electric motor when connected in series.

14. An arrangement according to claim 13, further comprising a battery means connected in series with said electric motor and said thermostatic switch means;
- an ignition switch means connected in series with said battery means for turning on said engine on and off;
- a short out switch means connected to said ignition switch means and in parallel to said heater unit for connecting said electric motor without the heat unit connected in series with it when said ignition switch means is switched on.

15. An arrangement according to claim 14, further comprising a rear window heating switch means connected in series with said ignition switch and an actuating means of said rear window heating relay means for activating said actuating means when said heating switch means is switched on, wherein said rear window heating relay means further includes a second contact means connected in series with said battery means and said heating unit when said heating switch means and said ignition switch means are both switched on for turning on said heating unit without said electric motor.

* * * * *